United States Patent
Schwartz (10) Patent No.: US 9,985,516 B2
(45) Date of Patent: May 29, 2018

(54) DC/DC CONVERTER AND METHOD FOR ZERO VOLTAGE SWITCHING

(71) Applicant: Palo Alto Research Center Incorporated, Palo Alto, CA (US)

(72) Inventor: David E. Schwartz, San Carlos, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 559 days.

(21) Appl. No.: 14/178,590

(22) Filed: Feb. 12, 2014

(65) Prior Publication Data

US 2015/0229200 A1 Aug. 13, 2015

(51) Int. Cl.
*H02M 5/293* (2006.01)
*H02M 1/08* (2006.01)
(Continued)

(52) U.S. Cl.
CPC ............ *H02M 1/083* (2013.01); *H02M 1/44* (2013.01); *H02M 3/3376* (2013.01); *H02M 3/33507* (2013.01); *H02M 3/33592* (2013.01); *H02M 2001/0058* (2013.01); *Y02B 70/1433* (2013.01); *Y02B 70/1475* (2013.01); *Y02B 70/1491* (2013.01)

(58) Field of Classification Search
CPC ................................. H02M 5/27; H02M 5/257
USPC ........ 363/16, 17, 20–21.18, 40, 56, 98, 131, 363/132
See application file for complete search history.

(56) References Cited

U.S. PATENT DOCUMENTS 5,151,852 A * 9/1992 Jacobson ............. H02M 3/337
  363/131
5,159,541 A 10/1992 Jain
(Continued)

FOREIGN PATENT DOCUMENTS

WO WO2007145388 12/2007

OTHER PUBLICATIONS

Hamill, "Class DE Inverters and Rectifiers for DC-DC Conversion", Power Electronics Specialists Conf., Jun. 1996, 8 pages.
(Continued)

*Primary Examiner* — Adolf Berhane
*Assistant Examiner* — Nusrat Quddus
(74) *Attorney, Agent, or Firm* — Hollingsworth Davis, LLC (57) ABSTRACT

A DC/DC converter having an inverter which accepts a DC input voltage, a rectifier that produces a DC output voltage, a resonant tank, and a controller. The inverter includes a first and second switch as does the rectifier. The resonant tank is coupled between the inverter and the rectifier. The controller is configured to independently control and adjust the phase and duty cycle of each of the four switches such that zero-voltage switching occurs for each switch as each switch transitions. The controller utilizes input parameters such as the DC input voltage, a target output voltage, and a target output current to determine the appropriate phase and duty cycle of each of the four switches. Zero-voltage switching occurs for each of the four switches when the switch is transitioning and a voltage across the switch is substantially zero.

30 Claims, 10 Drawing Sheets (51) Int. Cl.
    *H02M 3/335* (2006.01)
    *H02M 1/44* (2007.01)
    *H02M 3/337* (2006.01)
    *H02M 5/297* (2006.01)
    *H02M 1/00* (2006.01)

(56) References Cited

U.S. PATENT DOCUMENTS

| | | | | |
|---|---|---|---|---|
| 5,768,112 | A * | 6/1998 | Barrett | H02M 1/4241 363/132 |
| 6,356,462 | B1 * | 3/2002 | Jang | H02M 3/33569 363/132 |
| 6,788,033 | B2 | 9/2004 | Vinciarelli | |
| 8,300,429 | B2 * | 10/2012 | Orr | H02M 1/4225 363/21.02 |
| 8,520,420 | B2 * | 8/2013 | Jungreis | H02M 3/3376 363/17 |
| 8,638,571 | B2 * | 1/2014 | Tschirhart | H02M 3/3376 363/17 |
| 8,654,546 | B2 * | 2/2014 | Lin | H02M 3/3376 363/21.02 |
| 8,717,782 | B2 * | 5/2014 | Huang | H02M 7/53806 363/131 |
| 8,811,039 | B2 * | 8/2014 | The Ngo | H02M 3/33584 363/21.02 |
| 8,842,450 | B2 * | 9/2014 | Jungreis | H02M 3/285 363/21.03 |
| 2006/0152947 | A1 * | 7/2006 | Baker | H02M 1/4241 363/16 |
| 2010/0321041 | A1 | 12/2010 | Feldtkeller | |
| 2011/0103098 | A1 * | 5/2011 | Wu | H02M 1/36 363/17 |
| 2014/0301111 | A1 * | 10/2014 | Jungreis | H02M 1/08 363/21.07 |
| 2015/0023063 | A1 * | 1/2015 | Perreault | H02M 3/337 363/17 |

OTHER PUBLICATIONS

File History for EP App. No. 15153641.4 as retrieved from the EP Electronic File System on Aug. 5, 2016, 73 pages.

* cited by examiner

DC/DC CONVERTER AND METHOD FOR ZERO VOLTAGE SWITCHING

TECHNICAL FIELD

The present disclosure relates to a DC/DC converter and, more particularly, to an inverter/rectifier switching DC/DC converter that provides for zero-voltage switching (ZVS), and methods pertaining to same.

BACKGROUND

Switching topologies are ubiquitous for high-efficiency DC/DC converter designs. This class of topologies includes both non-isolated (e.g., buck, boost, Cuk, etc.) and isolated (e.g., flyback, forward, etc.) converters. Switching converters operate by periodically drawing energy from the input voltage source, temporarily storing it in passive elements including inductors and capacitors, and transferring the energy to the output at a desired voltage or current level, which may be distinct from that of the input. Converter operation is based on the periodic switching of one or more transistors (MOSFETs, IGBTS, etc.) at a usually fixed and sometimes variable frequency.

Reducing the physical size of switching DC/DC converters is advantageous for many applications. This is true in both the low power and high power domains, for example relating to handheld devices and solar power generation topologies, respectively. One technique of reducing the size of such converters is to increase the switching frequency. This reduces the per-cycle energy storage requirement of the converter for a given power, and thereby allows reduced values and, accordingly, size of the passive energy storage elements, i.e., the inductors and capacitors.

Increasing the switching frequency, however, tends to reduce the efficiency of the converter through several mechanisms. Switching loss, which refers to the discharging of the output capacitance of the switching devices (transistors) when they are switched off, increases with frequency. Gating loss, the charging and discharging of the transistor gate capacitance (for example in MOSFET-based designs), also increases with frequency. Furthermore, the magnetic cores of inductors have increased loss at higher frequencies, resulting primarily from hysteretic and eddy-current effects. In addition, the cores saturate at high currents. While materials are being developed to enable fabrication of cores with reduced losses, it can be advantageous to use high enough frequencies, approximately 10 MHz and above, at which the inductances required are low enough such that coreless inductors without these limitations can be used.

These considerations have led to the development of quasi- and fully-resonant topologies that reduce the switching loss of high-frequency converters. The primary advantage of resonant topologies is the implementation of zero-voltage switching (ZVS) converters, in which the switching devices are switched while the voltage across them is zero and no charge is stored on the output capacitance. This significantly reduces the switching loss. Resonant switching is implemented by the use of one or more resonant tanks comprising one or more inductors and capacitors to periodically store the output charge. The switching signals are timed such that the switches are turned off when the output voltage is zero. Some fully-resonant topologies also implement resonant gating techniques in which gating loss is reduced or eliminated by periodically storing gate charge in a resonant tank.

To maintain ZVS, the interval during which quasi-resonant switches are off is fixed as half the resonant period of the quasi-resonant tank. Regulation of output power in quasi-resonant topologies is limited to variable-frequency control which requires variable oscillators and creates broadband electromagnetic interference (EMI), both undesirable characteristics. Fully resonant topologies, on the other hand, operate at a fixed frequency and fixed duty cycle. Load regulation is implemented through operating multiple converters in parallel with varying phase offsets or through using passive networks to switch between real and reactive power, see, e.g., U.S. Pat. No. 7,535,133. The former solution greatly increases the number of components in the system, reducing the advantage in miniaturization, and increasing the cost. The latter solution increases voltage stress and is limited in the range of voltage ratios and loads over which high efficiency can be maintained.

SUMMARY

Disclosed herein are various embodiments of a DC/DC converter having an inverter, rectifier, resonant tank, and controller. The inverter includes a first and second switch as does the rectifier. The resonant tank is coupled between the inverter and the rectifier. The controller is configured to independently control and adjust the phase and duty cycle of each of the four switches such that zero-voltage switching occurs for each switch as each switch transitions. The controller utilizes input parameters such as the DC input voltage, a target output voltage, and a target output current to determine the appropriate phase and duty cycle of each of the four switches. Zero-voltage switching occurs for each of the four switches when the switch is transitioning and a voltage across the switch is substantially zero.

Variations of the above-described DC/DC converter include resonant gate drivers providing the gate signals of each of the four switches. The variations further include the resonant tank having a resonance frequency that may or may not equal the converter switching frequency. The DC/DC converter may incorporate a look-up table that provides control signal parameters for each of the four switches. The look-up table may be populated through iterative simulation or measurement of the converter in applying different loads. The DC/DC converter may be implemented in a single chip, may have one or more inductors that are fabricated on a die, and/or may be implemented in a chip carrier. The DC/DC converter may have an asynchronous, diode-based, rectifier instead of the switch-based synchronous rectifier. The DC/DC converter may include an output filter. The DC/DC converter may connect the resonant tank between the source of the first inverter switch and the drain of the second inverter switch as well as between the source of the first rectifier switch and the drain of the second rectifier switch. The DC/DC converter may additionally include a transformer.

A procedure or method for converting a DC voltage to a DC voltage includes inverting a DC input voltage to a first AC output voltage through use of a first inverter switch and a second inverter switch. It also includes transmitting the AC output voltage through a resonant tank to produce a second AC output voltage. It further includes rectifying the second AC output voltage to a DC output voltage through use of a first rectifier switch and a second rectifier switch. It also includes independently controlling and adjusting a phase and duty cycle of each of the four switches based on input parameters such as the DC input voltage, a target output voltage and a target output current. Controlling and adjusting of the phase and duty cycle of each of the four switches results in zero-voltage switching of each switch. Zero-voltage switching occurs when a switch is transitioning and a voltage across the switch is substantially zero.

The procedure or method described above may further include delivering control signals to the gates of each of the four switches that has been acted upon by resonant gate drivers prior to delivery. The method may further establish the four switches as operating at a switching frequency that may or may not be equal to a resonant tank frequency. The step of controlling and adjusting may include utilizing a look-up table to determine the appropriate phase and duty cycle for each switch. The method may further include populating the look-up table through iterative simulation or measurement of the converter at varying loads. The step of rectifying may include asynchronous rectifying. The method may further include the step of filtering the DC output voltage.

Embodiments of DC/DC conversion described herein can involve operating a non-isolated or an isolated class-DE, or other appropriate class, inverter/rectifier switching DC/DC converter so as to maintain zero-voltage switching on all switches by independently varying the timing and duty cycle of all switches. This can provide for high-efficiency power conversion with a single converter over wide voltage and power ranges.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure relates to an approach to high-frequency DC/DC power conversion based on a class-DE topology, although it is equally applicable to other classes of topology. It builds upon, and is advantageous over, two previous approaches along these lines: the fixed-frequency class-DE inverter/rectifier, and asymmetrical pulse-width-modulated (APWM) resonant DC/DC converter. The class-DE inverter is a fixed-frequency, fixed-duty-cycle converter and has limited ability to regulate the load or voltage ratio (see, e.g., Hamill, David C. "Class DE Inverters and Rectifiers for DC-DC Conversion." *Power Electronics Specialists Conference*, 1996 *PESC'96 Record.*, 27th *Annual IEEE*. Vol. 1. IEEE, 1996). The APWM converter uses a variable duty-cycle to regulate the load. However, the duty cycles of the switches are not independently controlled, as is discussed in U.S. Pat. No. 5,159,541 to Jain ("According to the present invention, the gating signals applied to switches $S_1$ and $S_2$ are such that they are complementary to each other. This means that if the duty cycle for switch $S_1$ is D, then the duty cycles for switch $S_2$ should be (1-D)." See also U.S. Pat. No. 6,097,614 to Jain). Furthermore, the disclosed design is limited in being an asynchronous topology, with associated diode losses, and no obvious means for converting to a synchronous topology, given the specified dependency and limited availability of control signals. A transformer is not integral to embodiments of the present disclosure, although one can be utilized if input-output isolation is desired.

Embodiments of the present disclosure are directed to circuits and methods that provide for high-efficiency DC/DC power conversion optimized for high switching frequency by maintenance of zero-voltage switching (ZVS) on all switches over relatively wide voltage-ratio and load ranges through quasi-independent tuning of multiple control parameters. According to various embodiments, the base topology is a synchronous class-DE inverter/rectifier pair, however, as previously mentioned, the design is equally applicable to other classes. In systems described above, the number of control parameters is zero (Hamill) or one (i.e., duty cycle, Jain). The use of synchronous conversion allows increased efficiency over diode-based designs as diode-drop loss is eliminated. The presently disclosed design is also advantageous over conventional resonant and quasi-resonant converters in that it is fixed frequency and single phase.

Figure 1:
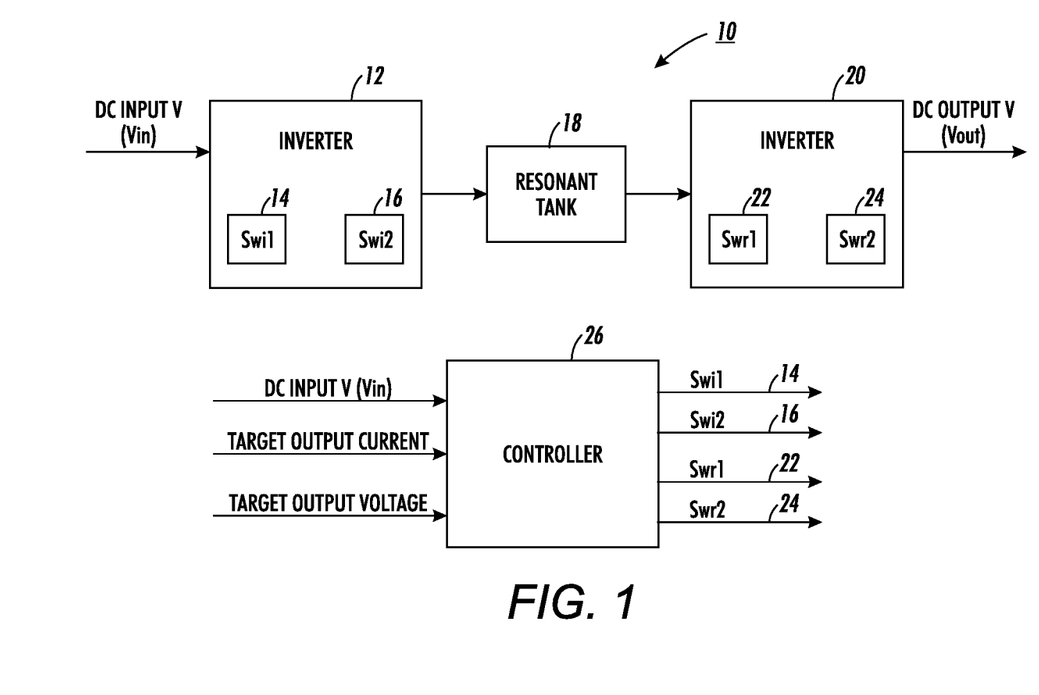
FIG. 1 is a block diagram illustrating details of a DC/DC converter according to an example embodiment.

In reference to FIG. 1, a block diagram illustrates the basic components of a DC/DC converter 10 according to an example embodiment. As shown, a DC input voltage ($V_{IN}$) is provided to an inverter 12 having a first inverter switch ($S_{wi1}$) 14 and a second inverter switch ($S_{wi2}$) 16. The inverter 12 inverts the input DC signal to produce a first AC output signal. The first AC output signal is supplied to a resonant tank 18, the function of which will be further explained below, whereby a second AC output signal is generated. The second AC output signal is supplied to a rectifier 20 having a first rectifier switch ($S_{wr1}$) 22 and a second rectifier switch ($S_{wr2}$) 24. The rectifier 20 produces a DC output voltage ($V_{out}$). A controller 26 receives various input signals including the DC input voltage, a target output current and a target output voltage. The controller 26, preferably a microprocessor or equivalent device, operates on those signals and produces an output control signal to each of the four switches 14, 16, 22 and 24.

Figure 2:
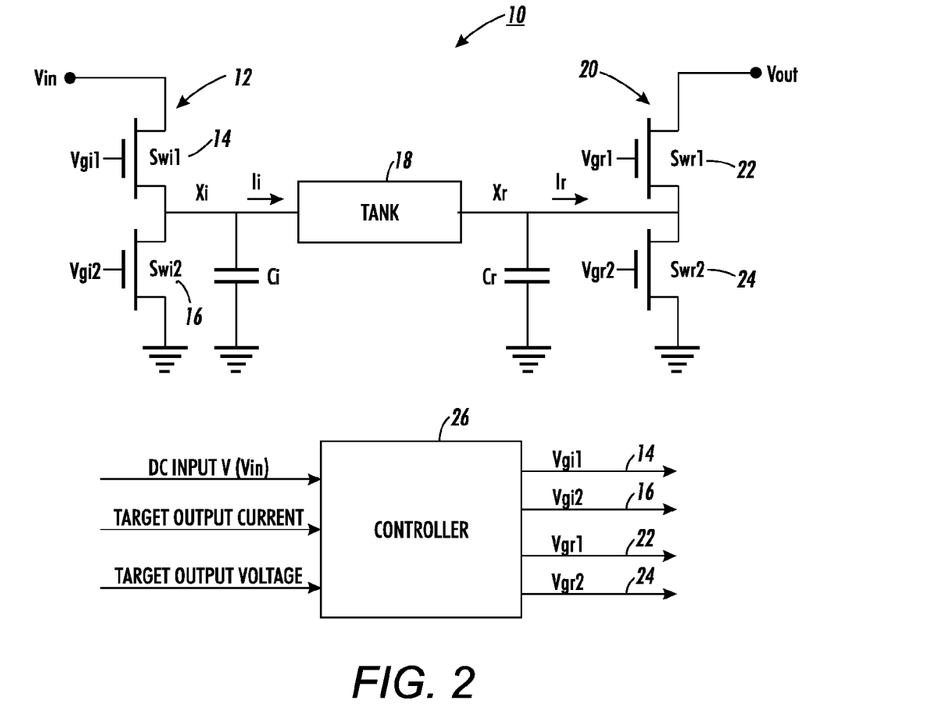
FIG. 2 is schematic illustrating the basic topology of a DC/DC converter according to an example embodiment.

In reference to FIG. 2, a schematic illustrates the basic topology of a DC/DC converter 10 according to an example embodiment. The DC/DC converter 10 comprises a class-DE inverter stage (inverter 12), snubber capacitors ($C_i$ and $C_r$) tied to ground, the resonant tank 18, a class-DE rectifier stage (rectifier 20), and the controller 26. The inverter 12 and rectifier 20 each include two switches; the first inverter switch 14 ($S_{wi1}$), the second inverter switch 16 ($S_{wi2}$) whose source is tied to ground, the first rectifier switch 22 ($S_{wr1}$) and the second rectifier switch 24 ($S_{wr2}$) whose source is tied to ground, respectively. Each of the switches, 14, 16, 20 and 24 can be MOSFETs, GaN HEMTs, or any other type of current switching devices.

Notably, the input of the resonant tank 18 is connected to the source of the first inverter switch 14 ($S_{wi1}$) and the drain of the second inverter switch 16 ($S_{wi2}$). Furthermore, as the snubber capacitors ($C_i$ and $C_r$) are in parallel with the output of the switches 14, 16, 22 and 24, the total capacitance a node $X_i$ is $C_{itot}=C_i+C_{Swi1}+C_{Swi2}$ and that at node $X_r$ is $C_{rtot}=C_r+C_{Swr1}+C_{Swr2}$, where $C_{Swix}$ denotes the output capacitance of switch $S_{wix}$ and $C_{Swrx}$ denotes the capacitance of switch $S_{wrx}$. In some embodiments, where the components and specification allow, $C_i$ and/or $C_r$ can be eliminated.

Figure 3:
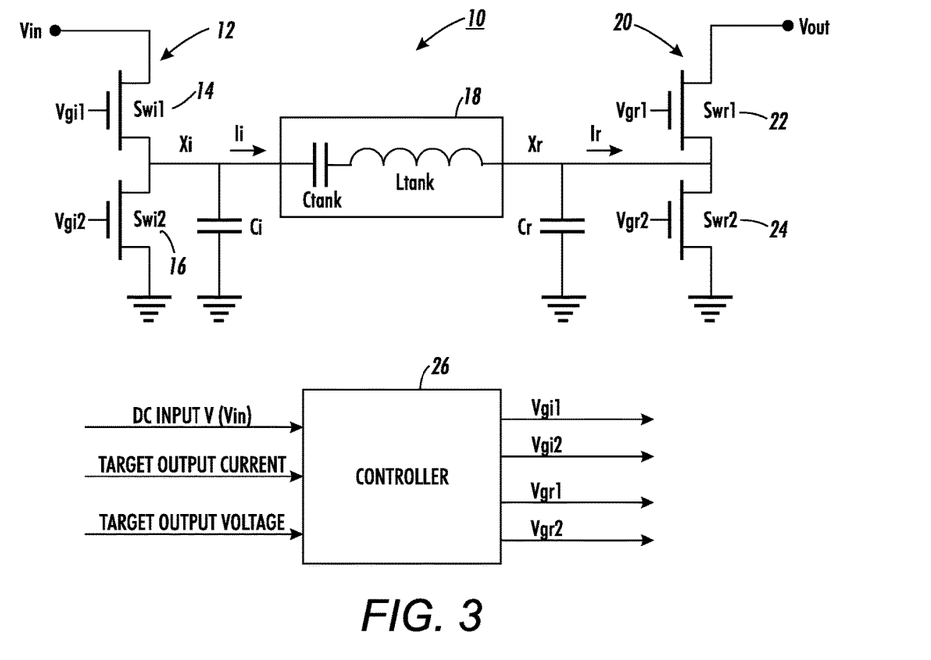
FIG. 3 is a schematic illustrating a DC/DC converter with resonant tank elements according to an example embodiment.

Referring to FIG. 3, a schematic illustrates the DC/DC converter 10 of FIG. 2 with resonant tank 18 elements disclosed according to an example embodiment. The resonant tank 18 can be implemented as a series-connected inductor and capacitor as shown in FIG. 3, but can be a more complex or different design as the application dictates.

Figure 4:
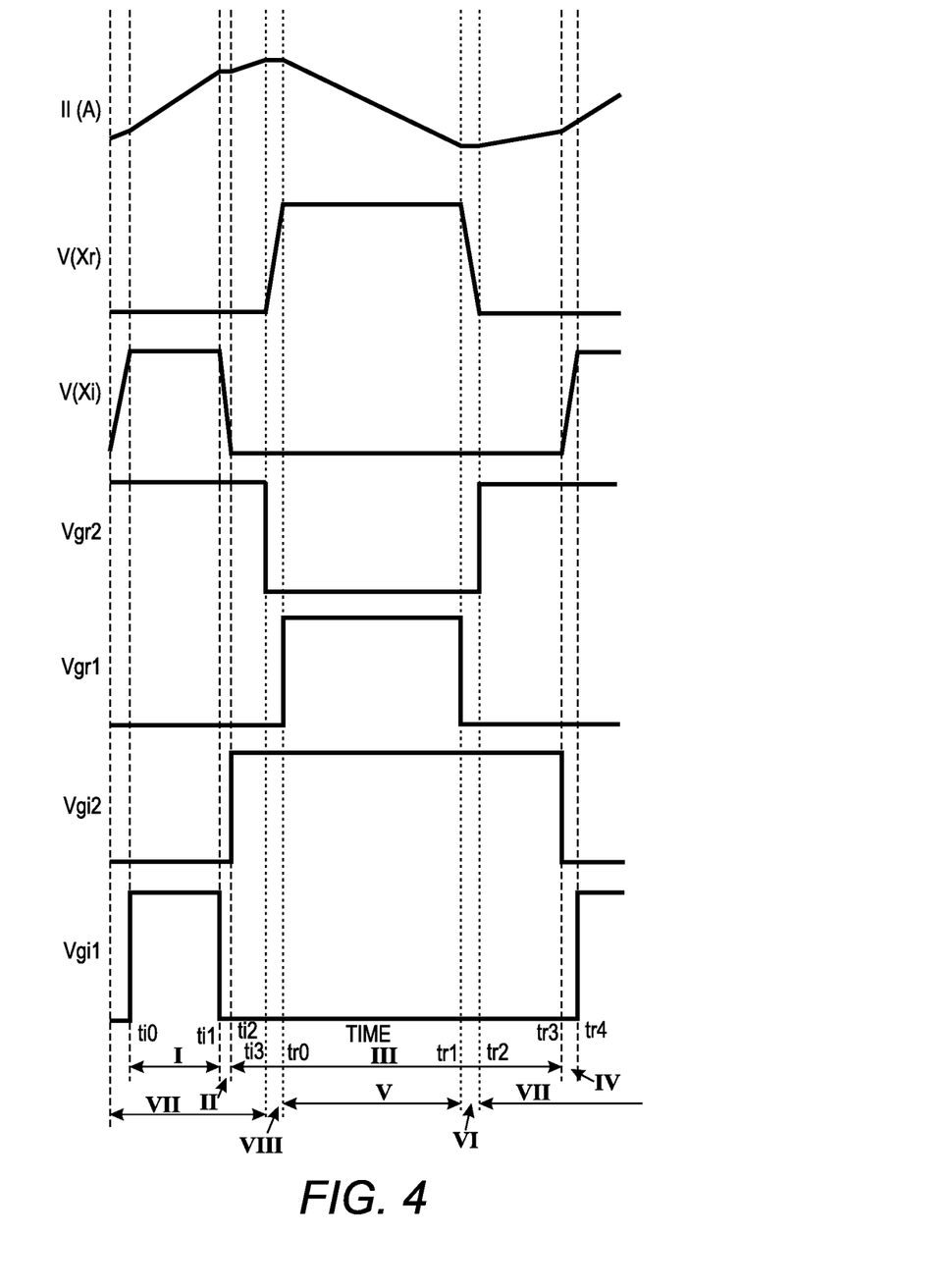
FIG. 4 is a wave diagram illustrating the switching waveforms of a DC/DC converter according to an example embodiment.

Referring now to FIG. 4, a waveform diagram illustrates the switching waveforms of a DC/DC converter 10 according to an example embodiment. It should be noted that in other embodiments or operating conditions, the control signals may look significantly different. In particular, the intervals II, IV, VI, and VIII may be significantly longer than intervals I, III, V, and VII. In addition, $t_{r1}$ may have any phase offset relative to $t_{i1}$, and may not, for example, fall between $t_{i2}$ and $t_{i3}$. The key attributes of the waveforms that are relevant to the example embodiment are that intervals II, IV, VI, and VIII are not null and that the relative timings of $t_{i1}$-$t_{i4}$ and $t_{r1}$-$t_{r4}$ can be set by the controller 26.

A description of the inverter waveforms of FIG. 4 is provided hereafter. In interval I, which starts at time $t_{i0}$, gate signal $V_{gi1}$ is high (above the threshold of switch $S_{wi1}$) and switch $S_{wi1}$ is on (conducting). During this interval, node $X_i$ is approximately at the source voltage $V_{in}$ so the voltage across $S_{wi1}$ is substantially zero. Inverter capacitance $C_{itot}$ is charged to $Q_{ion}=C_{itot}*V_{in}$. At time $t_{i1}$, gate signal $V_{gi1}$ is switched to low (below the threshold of switch $S_{wi1}$) and switch $S_{wi1}$ is turned off with substantially zero voltage across it. During interval II, capacitance $C_{itot}$ is discharged and the voltage at node $X_i$ decreases. When this voltage reaches substantially zero (time $t_{i2}$), switch $S_{wi2}$ is turned on with substantially zero voltage across it via gate signal $V_{gi2}$. During interval III, $S_{wi2}$ remains on with substantially zero voltage across it. At time $t_{i3}$, switch $S_{wi2}$ is turned off, again with substantially zero voltage across it. During interval IV, capacitance $C_{itot}$ charges until at time $t_{i4}$ node $X_i$ reaches $V_{in}$, and switch $S_{wi1}$ is turned on again with substantially zero voltage across it, completing the cycle. The time from $t_{i0}$ to $t_{i4}$ is one period of the switching clock; the cycle is repeated with $t_{i4}$ equivalent to $t_{i0}$ for the subsequent period.

At the same time in a similar fashion, switches $S_{wr1}$ and $S_{wr2}$ are turned on and off according to the waveforms in FIG. 4 such that $S_{wr1}$ is on while the voltage at node $X_r$ is $V_{out}$, $S_{wr2}$ is on while the voltage at node $X_r$ is substantially zero, and both are off to charge and discharge capacitance $C_{rtot}$ such that zero-voltage switching (ZVS) is obtained at all transitions. Note that in the example embodiment of FIG. 3, $I_i=I_r$. It is also noted that, under some load and voltage conditions, it may not be possible to obtain ZVS at all switches.

While there is a fair amount of flexibility in the choice of components, several constraints should be considered.

Looking at FIG. 2, the integrated current $I_i$ is positive during interval I so that net power is drawn from the voltage source and, similarly, it is positive during interval VIII so that net power is delivered to the load (not shown). Furthermore, the integrated current $I_i$ over interval II is equal to $Q_{ion}$ and the integrated current $I_i$ over interval IV is equal to $-Q_{ion}$ so that the capacitance $C_{itot}$ charges and discharges fully. This gives a maximum value of $C_{itot}$, which varies directly with the maximum current $I_i$ during these intervals. Similarly, the integrated current charging and discharging through $C_{rtot}$ during the corresponding intervals is equal to $Q_{rtot}$. As resistive loss in an inductor is proportional to current, for example in the DC/DC converter 10 embodiment of FIG. 3, the peak current, and therefore the size of $C_{itot}$ and $C_{rtot}$ should be limited.

On the other hand, the energy stored in the resonant tank 18 each cycle is given by $E=P/(2\pi f)$, where P is the power and f is the operating frequency. The energy stored in an inductor is $½*L_{tank}I^2$ and that stored in a capacitor is $½*C_{tank}V^2$. This gives a framework for sizing the resonant tank 18 components; larger component values will result in reduced peak currents and voltage and reduced minimum $C_{itot}$ and $C_{rtot}$, smaller component values have smaller volumes and footprints (in general).

In one specific embodiment, validated through simulation (assuming ideal components), the switching frequency is 20 MHz, $C_{itot}=C_{rtot}=500$ pF, the resonant tank 18 of the form shown in FIG. 3, contains a 32 nH inductor and a 17.7 nF capacitor. To operate with $V_{in}=300V$, $V_{out}=500V$, and approximately 2.2 kW, one set of control values to ensure ZVS are: $t_{i0}=0$, $t_{i1}=10$ ns, $t_{i2}=11.35$ ns, $t_{i3}=47.82$ ns ($t_{i4}=50$ ns, etc.), $t_{r0}=17.12$ ns, $t_{r1}=37.12$ ns, $t_{r2}=39.12$ ns, $t_{r3}=65.32$ ns, (and $t_{r4}=67.12$ ns).

Operating of the circuit entails generating the gating signals $V_{gsi1}$, $V_{gsi2}$, V and $V_{gsr1}$, $V_{gsr2}$. These can be reduced to seven independent parameters, for example: the on-times, duty cycles or off-times of the four switches (four parameters) and the turn-on times (or turn-off times) of $V_{gsi2}$, $V_{gsr1}$, and $V_{gsr2}$ relative to the turn-on time (or turn-off time) of $V_{gsi1}$ (three parameters). For a given $V_{in}$ and load, the parameters are subject to six constraints: the four switches 14, 16, 22 and 24 are to be turned on under ZVS conditions (four constraints), the output voltage is to be $V_{out}$ (one constraint), and the phase of the rectifier 20 is to be correctly aligned with the phase of the current through the resonant tank 18 (one constraint).

This leaves one degree of freedom unaccounted for, the effect of which depends on the specific circuit design, but which can be used to tune performance. For example, in the embodiment of FIG. 3, the one degree of freedom can be used to set the tank free node ($X_f$) voltage, which should be optimized to be as low as possible.

In this way, for a given load and input and output voltages, the relative turn-on and turn-off times of the four gate signals are constrained by the requirement of maintaining ZVS at all four switches 14, 16, 22 and 24 at most by one degree of freedom. In the example embodiments disclosed herein, these constraints are used to form the rules of a control system utilizing controller 26 that takes as input parameters indicating the load and voltage conditions (e.g., input voltage, desired output voltage, and desired output current) and produces as output the four gating signals $V_{gi1}$, $V_{gi2}$, $V_{gr1}$, and $V_{gr2}$.

Given that the desired current may not be explicitly known, the control system can use a search algorithm to find the correct gating signals. For example, it can assume a certain load, set the gating signals accordingly, measure the output current to determine the actual load and then reset the gating signals to the correct values. As the load may be output-voltage-dependent, the control system may have to iterate this process several times. In an example embodiment, these outputs are stored digitally, for example in a look-up table. The look-up table can be populated initially by operating the converter 10 (or a simulation of the converter 10) under a subset of possible conditions and observing the gating signals that optimize performance. As an alternative to the look-up table, an equation may be fit to the data enabling an automatic calculation within the controller 26 to produce the gating signals.

The control signals produced by controller 26 may be delivered to the switches 14, 16, 22 and 24 via one of several means. In one example embodiment, a fast microprocessor or equivalent device can generate gate pulses to control gate driver devices, such as MOSFETs. This requires that sufficiently fast microprocessors and gate drivers are available. However, if this is the case, any of the many means for driving switching devices in power converters known in the art can be used. This approach has the advantage of simplicity.

Figure 5:
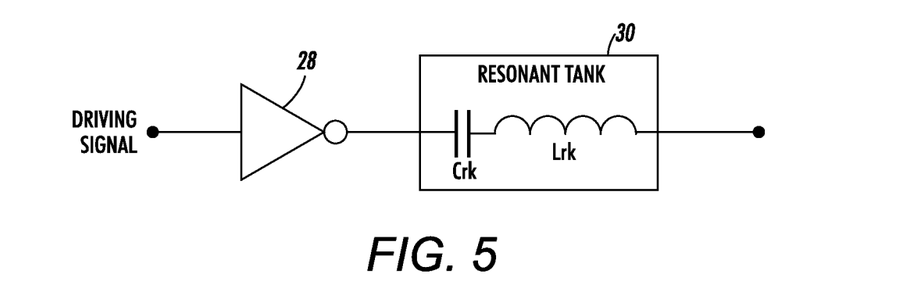
FIG. 5 is a schematic illustrating a resonant gate driver according to an example embodiment.

In another example embodiment, resonant or multi-resonant gate drivers can be used. These drivers can generate sinusoidal, trapezoidal or approximate square wave signals for driving the switches 14, 16, 22, and 24. Many circuits for creating such signals are known. The pulse width and phase of the driving waveforms can be controlled by varying the offset and phase of the sinusoidal signal. Because fixed phase relationships between the several drivers are needed according to various embodiments, resonant signals need to be synchronized with driving waveforms. FIG. 5 shows a simplified example of how such synchronization can be accomplished (driving signal input to NOT gate (inverter) 28 then to resonant tank 30 having capacitor $C_{rt}$ and inductor $L_{rt}$, to gate). Changing the phase of the driving signal can affect the phase of the gate signal. Resonant signals have the advantages of being able to generate high currents at fast rates as well as implementing "resonant gating" to recover the switching gate charge and thereby improve efficiency.

Figure 6:
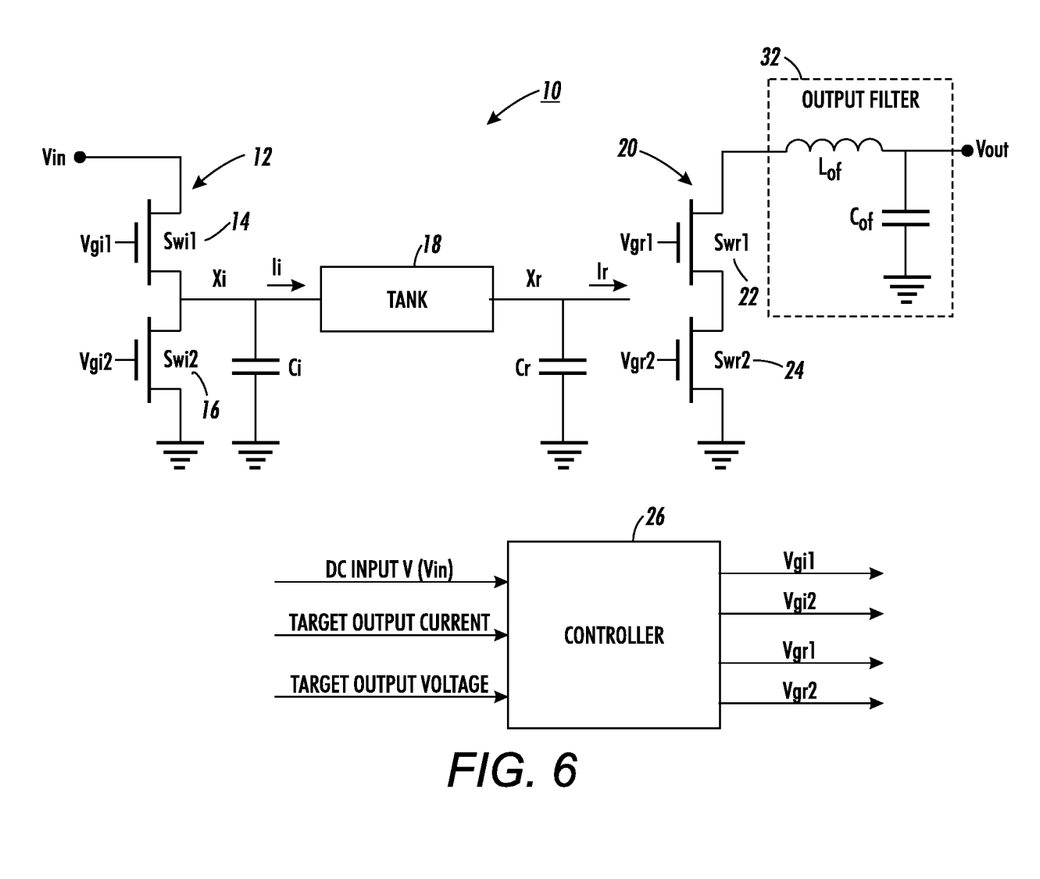
FIG. 6 is a schematic illustrating a DC/DC converter with an output filter according to an example embodiment.
Figure 7:
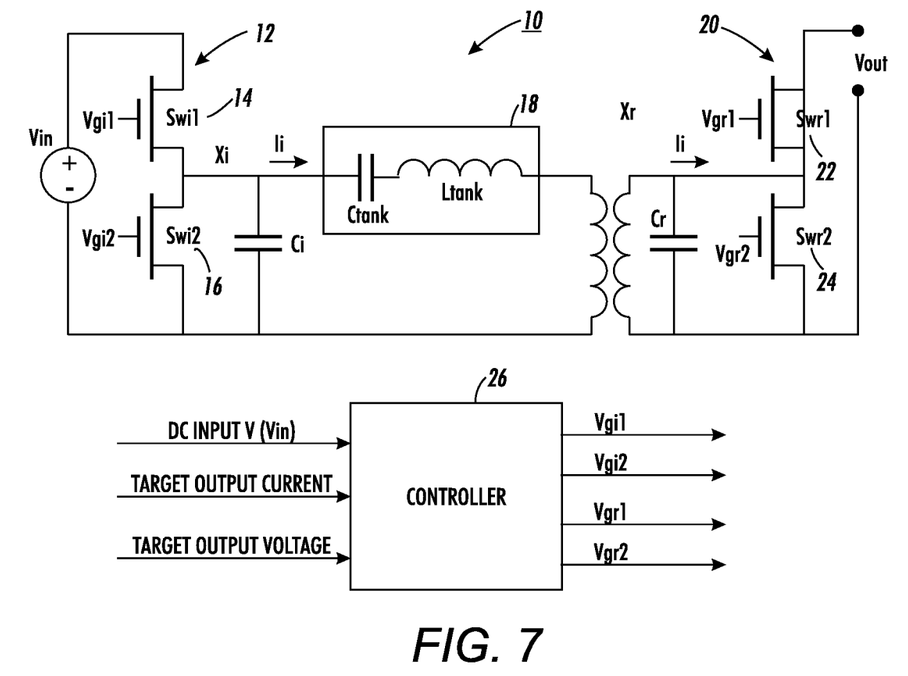
FIG. 7 is a schematic illustrating a DC/DC converter with a transformer according to an example embodiment.

Another example embodiment of the DC/DC converter 10 is shown in FIG. 6. In this topology, the output of rectifier 20 is supplied to an output filter 32, having inductor $L_{of}$ and capacitor $C_{of}$. Such an output filter may be included depending on the application requirements. Another example embodiment of DC/DC converter 10 is shown in FIG. 7. This schematic of the DC/DC converter 10 illustrates inverter 12 being inductively coupled, via use of transformer T, to rectifier 14 providing the overall topology with both step-up and step down capability.

Figure 8:
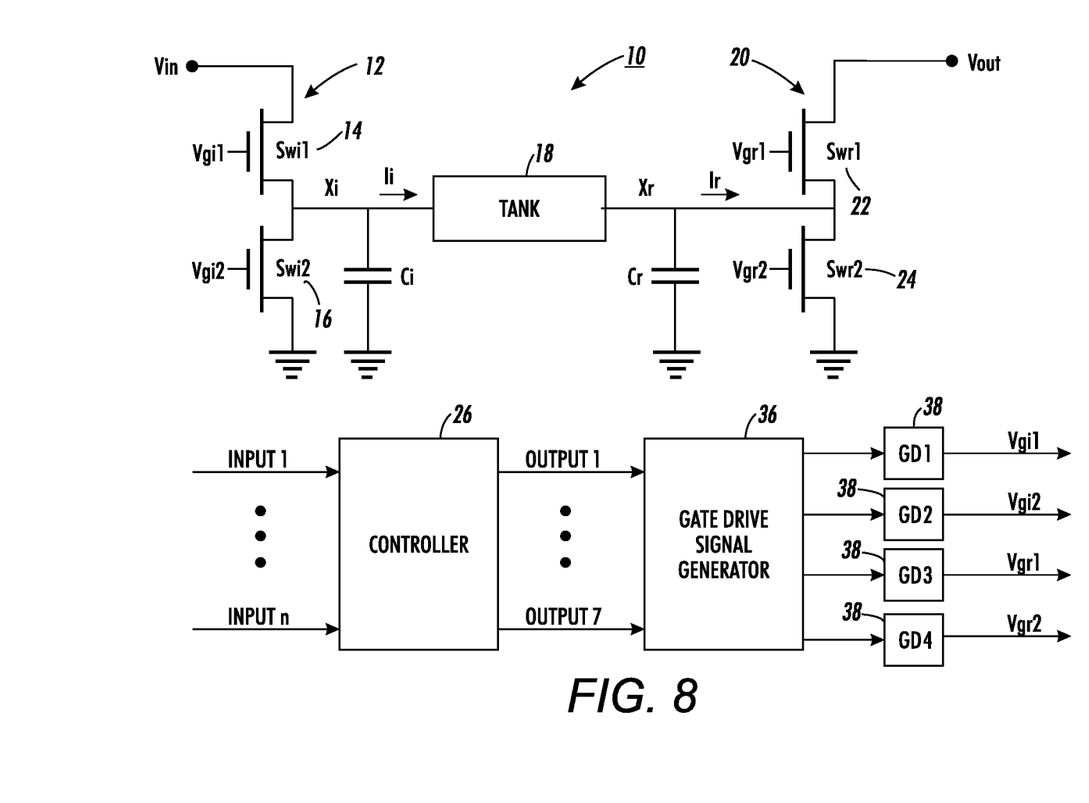
FIG. 8 is a schematic illustrating a DC/DC converter according to an example embodiment

While the above example embodiments of the DC/DC converter 10 have utilized the DC input voltage, the target output current and the target output voltage as the inputs to the controller 26, it should be noted that any number and variations on the types of input signals may be used by the controller to produce a control scheme by which the output signals to each of the switches 14, 16, 22 and 24 results in zero voltage switching, see FIG. 8. Such inputs further include but are not limited to feedback signals from the converter, e.g. measured output voltage, measured output current, voltages or currents measured at other locations within the converter 10 such as at nodes $X_i$ and $X_r$, as well as $I_i$ and $I_r$, and any combination thereof. Any of the described inputs in combination solely with the output voltage feedback or solely with the output current feedback may be particular useful in establishing a zero voltage switching control system.

Additionally, it should be noted that while the above example embodiments of the DC/DC converter 10 have described the controller 26 as producing four outputs, one for each of the four switches, the controller 26 may alternatively output up to seven parameter signals consistent with the seven degrees of freedom described earlier. The combination of outputs may include but is not limited to three relative phases (e.g., three relative turn-on times or three relative turn-off times) with four on-times, four duty cycles or four off-times. The parameter signals are then provided to a gate drive signal generator 36 the output of which goes to several gate drivers 38 which are connected to the transistor gates of the switches 14, 16, 22 and 24.

Figure 9:
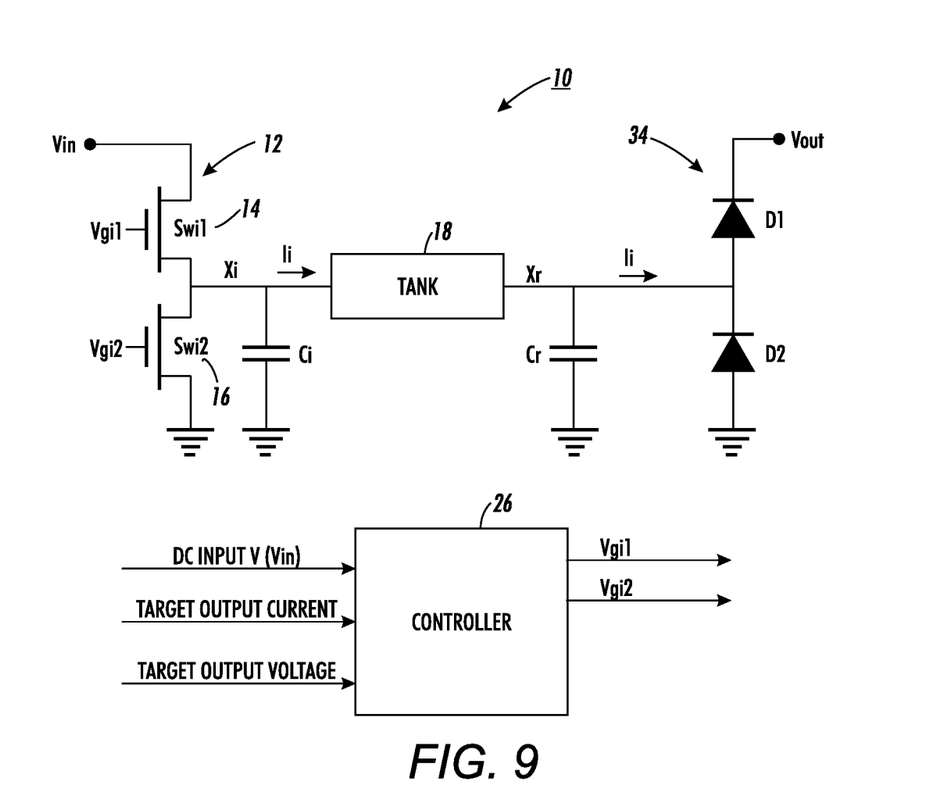
FIG. 9 is a schematic illustrating a DC/DC converter with an asynchronous rectifier according to an example of the invention.

Yet another example embodiment of DC/DC converter 10 is depicted in the schematic of FIG. 9. While the discussion above has focused on a DC/DC converter 10 with a synchronous rectifier 20, FIG. 9 illustrates that an asynchronous diode-based rectifier 34 can also be used. In this configuration, switch 22 ($S_{wr1}$) and switch 24 ($S_{wr2}$) are replaced with diodes D1 and D2, respectively. As such, the controller 26 must generate only the control signals $V_{gi1}$ and $V_{gi2}$, with three degrees of freedom, e.g., $t_1$, $t_2$, and $t_3$. Variations on the types of input/feedback used to generate the control signals for this converter are consistent with those described above as is the alternative for the controller 26 to produce parameter signals consistent with three degrees of freedom rather than seven.

Figure 10:
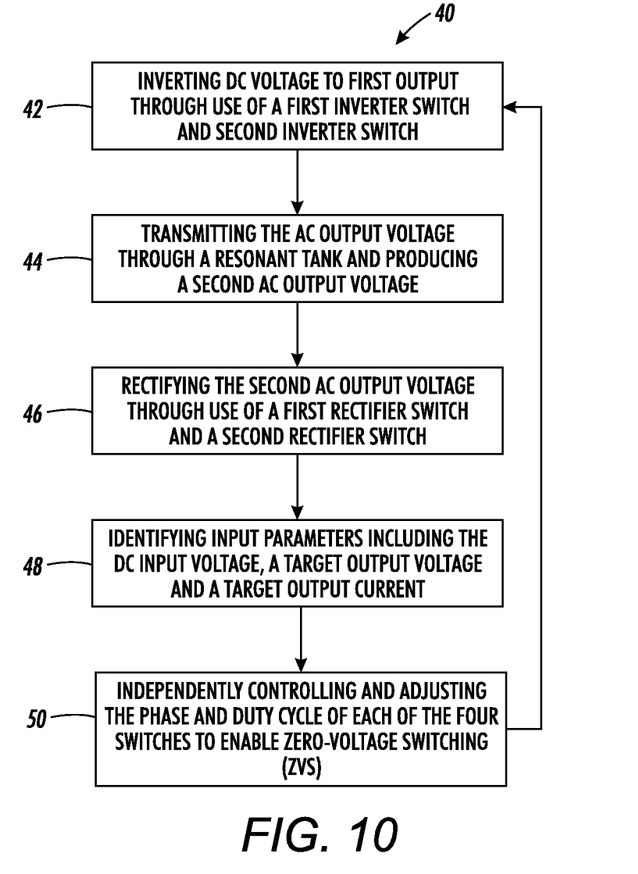
FIG. 10 is a flow chart illustrating a procedure according to an example embodiment.

FIG. 10 is a flow chart depicting an example procedure 40 for converting a DC voltage to a DC voltage through use of: an inverter, such as inverter 12 having a first inverter switch 14 and a second inverter switch 16; a resonant tank, such as resonant tank 18; a rectifier, such as rectifier 20 having first rectifier switch 22 and second rectifier switch 24; and a controller, such as controller 26. Procedure 40 includes inverting a DC input voltage to a first AC output voltage through use of a first inverter switch and a second inverter switch, per block 42. Procedure 40 further includes transmitting the AC output voltage through a resonant tank and producing a second AC output voltage, per block 44 and rectifying the second AC output voltage through use of a first rectifier switch and a second rectifier switch, per block 46. Procedure 40 additionally includes identifying input parameters including the DC input voltage, a target output voltage, and a target output current, per block 48 and independently controlling and adjusting the phase and duty cycle of each of the four switches to produce zero-voltage switching of each switch, per block 50, with the knowledge that zero-voltage switching of each switch occurs when the switch is transitioning and a voltage across the switch is substantially zero. The process then repeats returning to block 42. It should be noted that the above-described procedural steps may occur in any order and/or simultaneously as the procedure 40 requires.

Systems, devices or methods disclosed herein may include one or more of the features, structures, methods, or combinations thereof described herein. For example, a device or method may be implemented to include one or more of the features and/or processes described below. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. A DC/DC converter comprising:
   an inverter comprising a first inverter switch and a second inverter switch, the inverter configured to receive a DC input voltage and to supply an AC output voltage at an output of the inverter;
   a rectifier configured to supply a DC output voltage, the rectifier comprising a first rectifier switch and a second rectifier switch, at least one of the first and second inverter switches is not electrically connected to either of the first and second rectifier switches;
   a resonant tank coupled between the inverter and the rectifier; and
   a controller configured to independently control and adjust a phase and a duty cycle of each of the first inverter switch and the second inverter switch based on a plurality of input parameters such that zero-voltage switching (ZVS) of each of the inverter switches is enabled and maintained, wherein ZVS occurs for each switch during times that the switch is transitioning and a voltage across the switch is substantially zero, and wherein the controller is configured to independently control and adjust a phase and duty cycle of each of the first rectifier switch and the second rectifier switch based on the plurality of input parameters such that zero voltage switching (ZVS) of each of the rectifier switches is enabled and maintained.

2. The DC/DC converter of claim 1, wherein the controller produces a plurality of parameter outputs for generating control signals for each of the first inverter switch, the second inverter switch, the first rectifier switch, and the second rectifier switch.

3. The DC/DC converter of claim 2, wherein the plurality of parameter outputs is obtained from a look-up table within the controller.

4. The DC/DC converter of claim 2, wherein the plurality of parameter outputs comprises seven parameter outputs wherein each of the seven parameter outputs is representative of a degree of freedom.

5. The DC/DC converter of claim 4, wherein said rectifier comprises a diode rectifier having a first and a second diode.

6. The DC/DC converter of claim 5, wherein the plurality of input parameters comprises one or more of: the DC input voltage, a target output current of the converter, a target output voltage of the converter, a measured output current of the converter, a measured output voltage of the converter, a measured current from within the converter, and a measured voltage from within the converter.

7. The DC/DC converter of claim 4, further comprising an output filter configured to receive the output from the rectifier.

8. The DC/DC converter of claim 1, wherein each of the first inverter switch, second inverter switch, first rectifier switch, and second rectifier switch comprise a transistor.

9. The DC/DC converter of claim 8, wherein the transistor is selected from a group consisting of: MOS-FET, Power MOS-FET, LDMOS-FET, GaAs HEMT, GaN HEMT, and IGBT.

10. The DC/DC converter of claim 1, wherein the converter has a switching frequency and wherein the resonant tank has a resonance frequency substantially equal to the switching frequency.

11. The DC/DC converter of claim 10, wherein the switching frequency is greater than 5 MHz.

12. The DC/DC converter of claim 1, wherein the converter has a switching frequency and wherein the resonant tank has a resonance frequency different from the switching frequency.

13. The DC/DC converter of claim 1, wherein the plurality of parameter outputs comprise one or more of the following: a relative turn-on time, a relative turn-off time, an on-time duration, an off-time duration and a duty cycle.

14. The DC/DC converter of claim 1, wherein the inverter, the rectifier and the resonant tank are implemented in a single chip.

15. The DC/DC converter of claim 1, further comprising a transformer coupled between the resonant tank and the rectifier.

16. The DC/DC converter of claim 1, further comprising an inductor and wherein the inductor is free of a magnetic core.

17. The DC/DC converter of claim 1, wherein the inverter, rectifier and resonant tank are all packaged within a single chip carrier.

18. The DC converter of claim 1, wherein the resonant tank is connected to a source of the first inverter switch and a drain of the second inverter switch, and is also connected to a source of the first rectifier switch and a drain of the second rectifier switch.

19. The DC/DC converter of claim 1, wherein the plurality of input parameters comprises one or more of: the DC input voltage, a target output current of the converter, a target output voltage of the converter, a measured output current of the converter, a measured output voltage of the converter, a measured current from within the converter, and a measured voltage from within the converter.

20. A DC/DC converter comprising:
    an inverter comprising a first inverter switch and a second inverter switch, the inverter configured to receive a DC input voltage and to supply an AC output voltage at an output of the inverter;
    a rectifier configured to supply a DC output voltage, the rectifier comprising a first rectifier switch and a second rectifier switch, neither of the first and second rectifier switches electrically connected to the first inverter switch terminal;
    a resonant tank coupled between the inverter and the rectifier; and
    a controller configured to independently control and adjust a phase and a duty cycle of each of the first inverter switch and the second inverter switch based on a plurality of input parameters such that zero-voltage switching (ZVS) of each of the inverter switches is enabled and maintained, wherein ZVS occurs for each switch during times that the switch is transitioning and a voltage across the switch is substantially zero-and wherein the controller is configured to independently control and adjust a phase and duty cycle of each of the first rectifier switch and the second rectifier switch based on the plurality of input parameters such that zero voltage switching (ZVS) of each of the rectifier switches is enabled and maintained, wherein the controller includes a lookup table, wherein said lookup table provides a control signal for each of the first inverter switch, second inverter switch, first rectifier switch and second rectifier switch.

21. The DC/DC converter of claim 20, wherein the look-up table is populated through iterative simulation or iterative measurement of applying different loads to the converter.

22. A method of converting a DC voltage to a DC voltage, the method comprising:
inverting a DC input voltage to a first AC output voltage through use of an inverter coupled to the DC input voltage terminals, the inverter comprising a first inverter switch and a second inverter switch, the inverting comprising independently controlling and adjusting a phase and duty cycle of each of the first inverter switch and the second inverter switch based on a plurality of input parameters such that the independent controlling and adjusting of the phase and duty cycle of each of the first and second inverter switches produces zero voltage switching (ZVS) of each of the first inverter switch and the second inverter switch;
transmitting the AC output voltage through a resonant tank to produce a second AC output voltage;
rectifying the second AC output voltage to a DC output voltage through the use of a rectifier coupled to the DC output voltage terminals, the rectifier comprising a first rectifier switch and a second rectifier switch, the rectifying comprising independently controlling and adjusting a phase and duty cycle of each of the first rectifier switch and the second rectifier switch based on the a plurality of input parameters such that the independent controlling and adjusting of the phase and duty cycle of each of the first and second rectifier switches produces zero voltage switching (ZVS) of each of the first rectifier switch and the second rectifier switch neither of the first or second rectifier switches connected to the first inverter switch;
wherein ZVS occurs for each switch during times that the switch is transitioning and a voltage across the switch is substantially zero and at least one of the first and second inverter switches is not electrically connected to either of the first and second rectifier switches.

23. The method of claim 22, wherein rectifying comprises synchronously or asynchronously rectifying.

24. The method of claim 22, further comprising delivering a control signal to each of the first and second inverter switch, and first and second rectifier switch via a resonant gate driver.

25. The method of claim 22, wherein the first inverter switch, second inverter switch, first rectifier switch and second rectifier switch operate under a switching frequency and wherein the resonant tank has a resonant frequency substantially equal to the switching frequency.

26. The method of claim 25, wherein the switching frequency is greater than 5 MHz.

27. The method of claim 22, wherein the first inverter switch, second inverter switch, first rectifier switch and second rectifier switch operate under a switching frequency and wherein the resonant tank has a resonant frequency different from the switching frequency.

28. The method of claim 22, wherein the step of independently controlling and adjusting comprises utilizing a lookup table to establish a phase and duty cycle for each switch thereby enabling ZVS.

29. The method of claim 28, further comprising the step of populating the look-up table through iterative simulation and/or iterative measurement sensitive to changing loads.

30. The method of claim 22, wherein the plurality of input parameters comprises one or more of: the DC input voltage, a target output current of the converter, a target output voltage of the converter, a measured output current of the converter, a measured output voltage of the converter, a measured current from within the converter, and a measured voltage from within the converter.

* * * * *